US011552960B2

(12) United States Patent
Lavedrine

(10) Patent No.: US 11,552,960 B2
(45) Date of Patent: Jan. 10, 2023

(54) TECHNIQUE FOR PROCESSING MESSAGES SENT BY A COMMUNICATING DEVICE

(71) Applicant: Orange, Paris (FR)

(72) Inventor: Rémi Lavedrine, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 88 days.

(21) Appl. No.: 16/767,538

(22) PCT Filed: Nov. 27, 2018

(86) PCT No.: PCT/FR2018/052984
§ 371 (c)(1),
(2) Date: May 27, 2020

(87) PCT Pub. No.: WO2019/106273
PCT Pub. Date: Jun. 6, 2019

(65) Prior Publication Data
US 2021/0176256 A1    Jun. 10, 2021

(30) Foreign Application Priority Data
Dec. 1, 2017    (FR) ...................................... 1761549

(51) Int. Cl.
*H04L 9/32* (2006.01)
*H04L 9/40* (2022.01)

(52) U.S. Cl.
CPC ........ *H04L 63/126* (2013.01); *H04L 63/0236* (2013.01); *H04L 63/0245* (2013.01); *H04L 63/1425* (2013.01)

(58) Field of Classification Search
CPC ............... H04L 63/126; H04L 63/0236; H04L 63/0245; H04L 63/1425; H04L 63/1408
See application file for complete search history.

(56) References Cited

U.S. PATENT DOCUMENTS

| | | | |
|---|---|---|---|
| 2008/0059588 A1* | 3/2008 | Ratliff | H04L 63/145 709/206 |
| 2008/0177843 A1 | 7/2008 | Gillum et al. | |
| 2010/0153394 A1* | 6/2010 | Wood | G06Q 10/107 707/737 |
| 2013/0091584 A1* | 4/2013 | Liebmann | H04L 63/0263 726/27 |
| 2017/0013005 A1 | 1/2017 | Galula et al. | |

OTHER PUBLICATIONS

International Search Report and Written Opinion dated Mar. 6, 2019 for Application No. PCT/FR2018/052984.

\* cited by examiner

*Primary Examiner* — Amie C. Lin
(74) *Attorney, Agent, or Firm* — Knobbe, Martens, Olson & Bear, LLP

(57) ABSTRACT

A processing technique can be implemented by a security device. The security device verifies that a message sent by a communicating device to a receiving device is a message to be sent. When the verification is positive, the message is sent to the receiving device. The security device than receives a notification sent by the receiving device indicating that the sent message is to be blocked. Subsequent messages of the same type as the message for which the notification was received, sent by communicating devices provided by the same manufacturer and with the same product identifier as those of the communicating device that sent the message are thus blocked by the security device during the verification process.

11 Claims, 2 Drawing Sheets

TECHNIQUE FOR PROCESSING MESSAGES SENT BY A COMMUNICATING DEVICE

RELATED APPLICATIONS

This application is the U.S. National Phase of Application No. PCT/FR2018/052984 entitled "TECHNIQUE FOR PROCESSING MESSAGES SENT BY A COMMUNICATING DEVICE" and filed Nov. 27, 2018, which claims the benefit of French Patent Application No. 1761549, filed Dec. 1, 2017, each of which is incorporated by reference in its entirety.

The invention relates to the general field of telecommunications.

The invention more particularly relates to a technique for processing messages sent by a communicating device. More precisely, these messages are sent via an access gateway to a receiver device.

The processing technique is applicable to the field of communicating devices or connected objects.

By communicating device or connected object, what is meant is a device able to exchange information with other devices. These devices include those that exchange information, via a communication network administrated by a network operator, with, according to the circumstances, another device, a communication terminal or even a computational equipment of the communication network. The communication network may be based on so-called 2G, 3G, 4G and 5G cellular mobile-network technologies, but also on low-power wide-area (LPWA) network technologies such as a LoRa network.

From the point of view of the user, communication by means of so-called long-range networks differs from communication by means of so-called short-range networks (such as Bluetooth, Bluetooth Low Energy, WiFi, Zigbee, Z-Wave, etc.) in the following advantages:
  independence from an intermediate equipment with respect to access to a wide-area communication network;
  security: most long-range technologies intrinsically integrate security features such as authentication and encryption, which offer a native security guarantee for the applications used on this network;
  simplicity of configuration and of use: there is no need to configure a security key or to carry out pairing, which operations may prove to be extremely complex for the user when the device does not incorporate a screen or is equipped with limited input/output peripherals, or indeed when the user is not used to this type of technology.

It has been observed that these communicating devices are at the present time not very secure and are becoming the target of attacks. It is possible for certain communicating devices to present one or more security flaws, liable to allow a malicious individual to take control remotely, for example by installing malware on the communicating device, with a view to carrying out malicious activities, such as stealing data, or carrying out a distributed denial of service (DDoS) attack for example. Such DDoS attacks target receiver devices to which the communicating devices send data.

One of the aims of the proposed technique is to remedy the insufficiencies/drawbacks of the prior art and/or to provide improvements thereto.

According to a first aspect, a method for processing messages sent by a communicating device is provided. The method comprises:

a verification by a security device that a message sent by a communicating device to a receiver device is a message to be transmitted, the message being transmitted to the receiver device when the verification is positive;

a reception by the security device of a notification sent by the receiver device indicating that the transmitted message is to be blocked, subsequent messages of the same type as the message for which the notification was received, sent by communicating devices provided by the same manufacturer and of same product identifier as those of the communicating device that sent said message being blocked by the security device during said verification.

This thus allows the receiver devices to be protected from communicating devices liable to present a security flaw. Specifically, it is becoming commonplace for malicious third-parties to take control of communicating devices because of their low security level. The implementation of this method thus allows general security to be increased via a rapid mastery of malicious behavior of communicating devices. A detection of a malicious behavior by the receiver device allows the security device to directly implement blockage of subsequent messages transmitted by other communicating devices. The security device thus implements for the communicating devices for which it is responsible the measures necessary to protect the receiver device.

The receiver device is located in the back-end of the network. It is thus intended to receive data coming from communicating devices located in the front-end of the network. The receiver device may for example provide a service based on the received data. The security device is also positioned in the front-end and allows the back-end of the network to be protected.

The processing method is particularly well suited to implementation for communicating devices, which generally are equipped with a processor that is not very powerful, but which comprise interfaces with the wide-area communication network, the Internet. Because of these interfaces, which allow control to be taken remotely, these communicating devices are becoming the target of attacks.

The security device may be collocated with an access gateway allowing access to the communication network. This access gateway allows communicating devices to access the communication network, and therefore to transmit data to the receiver device, which is located in the back-end of the network.

In one particular embodiment, the access gateway performs the functions of the security device.

The processing method thus takes advantage of the detection of a malicious behavior of a communicating device by the receiver device to neutralize any transmissions from other communicating devices of a message of the same type. These other communicating devices are devices of same product identifier and are therefore provided by the same manufacturer.

No modification is required to the communicating devices, the processing method being implemented in the network, essentially in the front-end of the network.

The various embodiments or features mentioned below may be added, independently or in combination with one another, to the processing method such as defined above.

In one particular embodiment, the processing method furthermore comprises a neutralization of the communicating device for which the notification was received.

Thus, the communicating device that sent the message is neutralized. Although controlled remotely by a malicious third-party, the communicating device can no longer harm the receiver device. It may be a question of various levels of neutralization. In one particular embodiment, the access to the communication network of the communicating device is deactivated: it can no longer send messages to the receiver device. In another embodiment, the communicating device is put out of use, for example by blocking the turn-on of its operating system.

In one particular embodiment of the processing method, subsequent messages of same type as the message for which the notification was received, sent by communicating devices provided by the same manufacturer and of different product identifier to those of the communicating device that sent said message are blocked by the security device during said verification.

Thus, the taking of control remotely by a malicious third-party of communicating devices of the same manufacturer is rapidly contained, the messages sent by these devices being blocked directly by the security device, before reaching the receiver device.

In one particular embodiment, the processing method comprises an obtainment by the security device of at least one message to be transmitted.

It is thus possible to configure the security device with a set of messages permitted for a given product identifier. It is also possible once the attack has ended to once again permit a transmission of the message, which was indicated as being to be blocked.

According to a second aspect, a security device intended to process a message sent by a communicating device to a receiver device is provided, said security device comprising a processing module arranged to:
 verify that said message is a message to be transmitted;
 transmit said message when the verification is positive and block it when the verification is negative;
 receive a notification sent by the receiver device indicating that the transmitted message is to be blocked, in order to block during the verification subsequent messages of same type as the message for which the notification was received, sent by communicating devices provided by the same manufacturer and of same product identifier as those of the communicating device that sent said message.

The advantages mentioned with respect to the processing method according to the first aspect are directly transposable to the security device.

In one particular embodiment of the security device, the processing module is furthermore arranged to block subsequent messages of same type as the message for which the notification was received, sent by communicating devices provided by the same manufacturer and of different product identifier to those of the communicating device that sent said message.

According to a third aspect, a security system is provided comprising:
a security device intended to process a message sent by a communicating device to a receiver device, said security device comprising a processing module arranged to:
 verify that said message is a message to be transmitted;
 transmit said message when the verification is positive and block it when the verification is negative;
 receive a notification sent by the receiver device indicating that the transmitted message is to be blocked, in order to block during the verification subsequent messages of same type as the message for which the notification was received, sent by communicating devices provided by the same manufacturer identifier and of same product identifier as those of the communicating device that sent said message;

a receiver device, arranged to receive said message sent by the communicating device and transmitted by the security device and to send said notification to the security device.

The advantages mentioned with respect to the processing method according to the first aspect are directly transposable to the security system.

According to a fourth aspect, a program for a security device, this program comprising program-code instructions intended to command the execution of those of the actions of the processing method described above that are implemented by the security device, when said program is executed by said device, and a storage medium readable by a device, on which is stored a program for a device, are provided.

The advantages mentioned with respect to the processing method according to the first aspect are directly transposable to the program for a security device and to the storage medium.

The technique for processing messages sent by a communicating device will be better understood from the following description of particular embodiments, which is given with reference to the appended drawings, in which.

Figure 1:
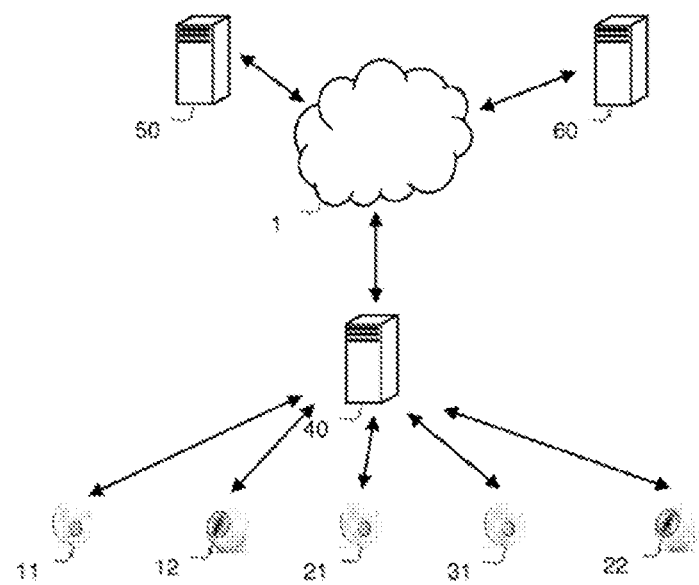
FIG. 1 shows communicating devices in their environment in one particular embodiment.

FIG. 1 shows an environment in which the processing method is implemented in one particular embodiment. The environment shown comprises communicating devices 11, 21, 31, 12, 22 accessing a communication network 1 via an access gateway 40. A communicating or connected device or object is an object suitable for exchanging information, via a communication network, with, according to the circumstances, another object, a communication terminal or even a computational equipment 60 of the communication network. Thus, below, by communicating device what is meant is not only physical objects connected to the network, but also "virtualized" application software associated with certain of these objects. Such communicating devices may be designated by the acronym IoT (for Internet of Things).

The communicating device 11, 21, 31, 12, 22 may be any type of terminal allowing data to be transmitted, such as a cell phone, a smartphone, a tablet, a connected object.

Thus, a communicating device or connected object may correspond to a mobile terminal, a watch suitable for transmitting information to a mobile terminal via a wide-area communication network such as the Internet, a smoke detector suitable for communicating with a remote mobile terminal in order to signal the presence of smoke in a house, a health-monitoring unit, a geolocating unit. In FIG. 1, thermostats 11, 21, 31 and movement detectors 12, 22 are shown. It will be recalled here that it is a question of an example of an environment and that no limitation is placed on the type of these communicating devices, nor on their number.

These communicating devices are suitable for transmitting data to a remote computational device, called the receiver device below, via a communication network 1. These data are transmitted in messages.

These messages are sent via the access gateway 40. This access gateway depends on the access network. The access network for example corresponds to a GSM, EDGE, 3G, 3G+ or 4G (also called LTE for Long Term Evolution) mobile communication network, inter alia. The access network may also correspond to a WiFi wireless network according to standard IEEE 802.11. The access network may also correspond to a low-power wide-area (LPWA) network such as a LoRa network.

In the embodiment shown, the communicating device 11, 21, 31, 12, 22 sends data to a server 60, which acts as the receiver device. This server 60 is arranged to provide a service based on the received data. This service may for example correspond to a health-related service, a home-care service or a localization service. No limitation is placed on the number of receiver devices.

The communicating device is identified by a unique identifier. This identifier for example corresponds to a unique IEEE EUI-48 (for Extended Unique Identifier) identifier. This unique identifier is a number coded on 48 bits allowing in particular the manufacturer, the product and the serial number to be identified.

For a low-power wide-area network, a LoRa network for example, this unique identifier may for example correspond to the unique DevEUI identifier of the device.

For a mobile communication network, this unique identifier is an identifier stored in a secure element of the communicating device during the phase of configuration of the latter.

FIG. 1 also shows a security device 50. In the particular embodiment that is described, this device receives all of the messages sent to a receiver device by communicating devices accessing the communication network via the access gateway 40. It is located so as to pick up the messages sent by the communicating devices before transmission of the verified messages to the receiver device. The security device 50 is arranged to verify that a message sent by a communicating device to a receiver device is a message to be transmitted. A message to be transmitted is said to be an authorized message. A message that is not to be transmitted is blocked by the security device and is said to be a non-authorized message. This verification is detailed below. In particular, in the environment shown in FIG. 1, the security device transmits to the server 60 the messages that are intended therefor. The security device thus transmits the messages depending on the receiver device for which they are intended. The security device located in the front-end of the network then protects a plurality of receiver devices.

In this particular embodiment, the security device is associated with an access gateway. The security device and the access gateway may be collocated. The security device may also be integrated into the access gateway 40.

In FIG. 1, a single security device has been shown. This figure is completely non-limiting.

Figure 3:
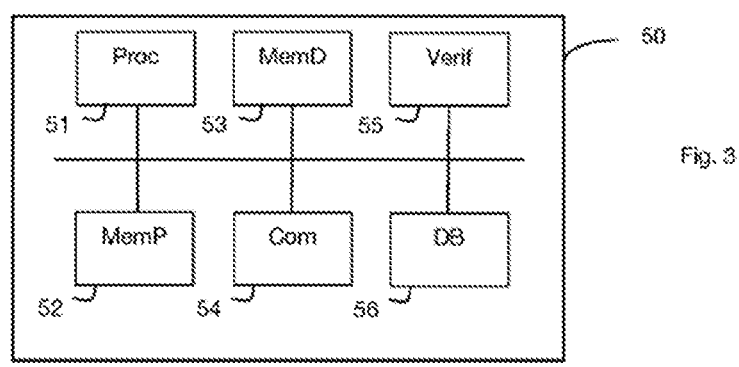
FIG. 3 shows a security device in one particular embodiment.

FIG. 3 schematically illustrates a security device 50 in one particular embodiment.

The security device 50, such as shown in FIG. 3, in particular comprises:
- a processor 51 for executing software module code instructions;
- a memory region 52, arranged to store a program that comprises code instructions for implementing steps of the processing method;
- a storage memory 53, arranged to store data used during the implementation of the processing method;
- a communication module 54, forming a communication interface with a communication network and arranged to communicate with the devices of a communication network;
- a processing module 55, arranged to verify that a message sent by a communicating device to a receiver device is a message to be transmitted, the message being transmitted to the receiver device when the verification is positive;
- a storage memory 56, arranged to store messages to be blocked.

The communication module 54 corresponds to a send/receive module that depends on the radio access technology.

The processing method implemented by the security device 50 will now be described with reference to FIG. 2.

Below, the communicating device 11 is considered.

The communicating device 11 sends a message M1-MSG1 to the server 60, which acts as the receiver device, via the access gateway 40. The latter transmits the received message to the security device 50.

The security device 50 verifies (E1) that the message MSG1 sent by the communicating device 11 to a receiver device 60 is a message to be transmitted for this type of communicating device. To do this, the security device 50 compares the message MSG1 with messages stored in the storage memory 56.

When the verification is positive, the message MSG1 is transmitted to its destination, the receiver device 60.

The receiver device 60 checks (F1) whether the message MSG1 is a message sent by a malicious communicating device. This detection may be based on analyses performed on a sequence of messages received from a communicating device, on correlations between messages received from various communicating devices, on time-domain analyses carried out on a sequence of messages. No limitation is placed on the way in which the receiver device 60 detects whether the message MSG1 is a message to be blocked or not. By way of illustration, the message MSG1 is a "healthy" message. The receiver device 60 then processes this message MSG1.

Subsequently, the communicating device 11 sends a message M2-MSG2 to the server 60 via the access gateway 40. The latter transmits the received message to the security device 50.

The security device 50 verifies (E1) that the message MSG2 sent by the communicating device 11 to a receiver device 60 is a message to be transmitted. To do this, the security device 50 compares the MSG2 with messages stored in the storage memory 56. The message MSG2 is not considered to be a message to be blocked for this type of communicating device. Since the verification is positive, the message MSG2 is transmitted (message O2-MSG2) to its destination, the receiver device 60.

The receiver device 60 detects (F1) that the message MSG2 is a message sent by a malicious communicating device. This device has become malicious, for example because control has been taken thereof remotely by a malicious third-party.

The receiver device 60 then sends, to the security device 50, a notification O3-NOK(MSG2) indicating that the transmitted message is to be blocked for this type of communicating device.

This notification is received (E2) by the security device 50 and the message MSG2 is stored in the storage memory 56. This notification indicates to the security device 50 that subsequent messages of the same type as the message MSG2 for which the notification was received, sent by communicating devices provided by the same manufacturer and of same product identifier as those of the communicating device 11 that sent this message, must be blocked by the security device 50 during the verification (E1).

Figure 2:
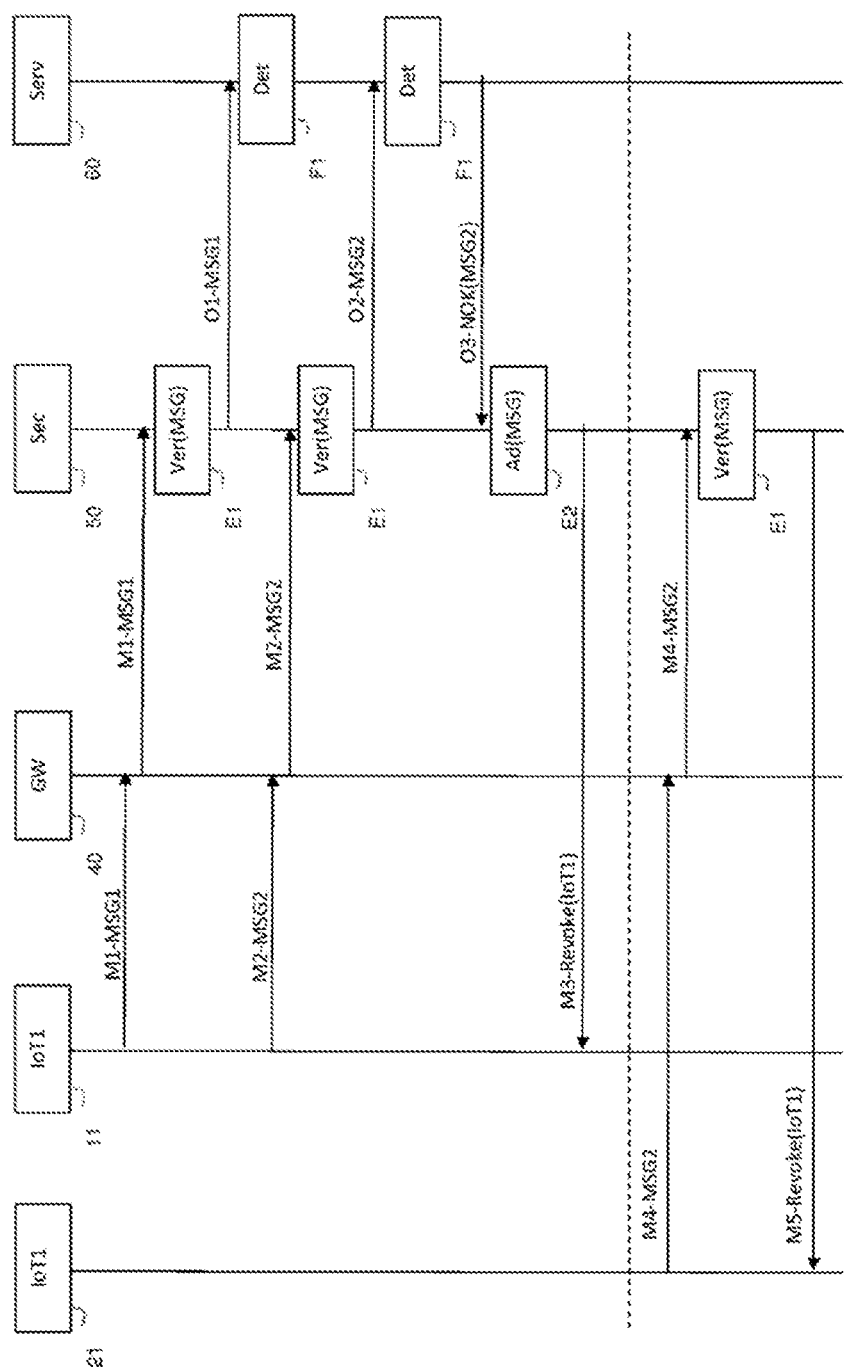
FIG. 2 illustrates steps of a processing method according to one particular embodiment.

In one particular embodiment, which is illustrated in FIG. 2, the security device 50 sends a message M3-Revoke requesting neutralization of the communicating device 11 for which the notification O3-NOK(MSG2) was received.

It may be a question of various levels of neutralization. In one particular embodiment, the access to the communication network of the communicating device 11 is deactivated: it can no longer send messages to receiver devices. In another embodiment, the communicating device is put out of use, for example by blocking the turn-on of its operating system. The communicating device 11 can no longer send any data and is no longer a risk to the other devices and the communication network. The receiver device 60 no longer processes messages coming from this revoked communicating device 11.

Returning to FIG. 2, the communicating device 21, which is a product provided by the same manufacturer and of the same type as the communicating device 11, is now considered.

The communicating device 21 sends a message M4-MSG2 to the server 60 via the access gateway 40. By way of illustration, this message M4 transits via this access gateway 40. It will be understood that, in other examples, the message M4 could transit via another access gateway associated with the same security device 50. The access gateway 40 transmits the received message to the security device 50.

The security device 50 verifies (E1) that the message MSG2 sent by the communicating device 21 to a receiver device 60 is a message to be transmitted. To do this, the security device 50 compares the MSG2 with messages stored in the storage memory 56. The message MSG2 has been sent by a communicating device provided by the same manufacturer and of same product identifier as those of the communicating device 11 that was the origin of the notification O3-NOK(MSG2). It is therefore blocked by the security device 50 and is not transmitted to the receiver device 60. The latter is thus protected from attacks resulting from control being taken of communicating devices provided by the same manufacturer and corresponding to a given product.

In one particular embodiment, the security device 50 sends a message M5-Revoke requesting neutralization of the communicating device 21. As described above with respect to the neutralization of the communicating device 11, it may be a question of various levels of neutralization. The communicating device 21 can no longer send any data and is no longer a risk to the other devices and the communication network.

In this embodiment, a message MSG2 sent by a communicating device provided by the same manufacturer but of different product identifier is not blocked and is transmitted to the receiver device 60. It is underlined here that a message MSG2 sent by a communicating device provided by a different manufacturer is also not blocked and is transmitted to the receiver device 60.

In another embodiment, subsequent messages of same type as the message MSG2 for which the notification O3-NOK(MSG2) was received, sent by communicating devices provided by the same manufacturer but of different product identifier to those of the communicating device that sent this message are blocked by the security device 50 during the verification (E1).

By way of illustration, the communicating device 12, which is provided by the same manufacturer as the communicating device 11 (thermostat) is considered. However, this communicating device 12 (movement detector) is a product of another type.

The communicating device 12 sends a message MSG2 to the server 60 via the access gateway 40. By way of illustration, this message MSG2 transits via this access gateway 40. It will be understood that, in other examples, the message MSG2 could transit via another access gateway associated with the same security device 50. The access gateway 40 transmits the received message to the security device.

The security device 50 verifies (E1) that the message MSG2 sent by the communicating device 12 to a receiver device 60 is a message to be transmitted. To do this, the security device 50 compares the message MSG2 with messages stored in the storage memory 56. The message MSG2 has been sent by a communicating device provided by the same manufacturer but of different product identifier to those of the communicating device 11 that was the origin of the notification O3-NOK(MSG2). It is therefore blocked by the security device 50 and is not transmitted to the receiver device 60. The latter is thus protected from attacks resulting from control being taken of communicating devices provided by the same manufacturer even though they correspond to a different product.

In one particular embodiment, the security device sends a message requesting neutralization of the communicating device 12. As described above with respect to the neutralization of the communicating device 11, it may be a question of various levels of neutralization. The communicating device 12 can no longer send any data and is no longer a risk to the other devices and the communication network.

In the embodiments described above, the storage memory 56 stores messages, such as the message MSG2, for which a notification has been received (E2) by the security device 50. These messages are messages to be blocked by the security device 50. In the initial state, all the messages are therefore said to be to be transmitted. The storage memory 56 is gradually enriched, depending on the messages for which a notification is received.

In one particular embodiment, the storage memory 56 also stores messages to be transmitted. These messages are assumed to be "healthy" or authorized. It is thus possible to store a set of messages capable of being sent by communicating devices provided by the same manufacturer and of same product identifier. This set of messages is for example obtained from the manufacturer. The security device 50 and its storage memory 56 are configured with this set of messages. In one particular embodiment, the set of messages such as configured by the manufacturer is received by means of a communication interface. In this particular embodiment in which the storage memory 56 stores messages to be transmitted, the message MSG2 is deleted from the set of "healthy" messages for this type of communicating device on reception of the notification O3-NOK(MSG2), in order to be blocked by the security device 50. Thus, the verification (E1) comprises a comparison of the received message MSG1, MSG2 in order to check whether it belongs to the set of messages to be transmitted.

In the same way as the receiver device requested the message MSG2 be blocked by means of the notification O3-NOK(MSG2), the receiver device 60 may ask the security device 50 that the message MSG2 be once again considered as a message to be transmitted. The security device 50 thus obtains at least one message to be transmitted. This allows a normal operating mode to be returned to, once the security flaw affecting the communicating devices has been resolved.

In one particular embodiment, the receiver device 60 may also ask other security devices to block the message MSG2 for this type of communicating device.

It will be understood that this processing technique allows the security of a communication network to be improved, by protecting receiver devices located in the back-end from communicating devices that could otherwise be the authors of a malicious attack. Such devices are isolated and cannot continue their attacks. In addition, this neutralization may also be extended to other devices of same type, or even to devices of same manufacturer.

No limitation is placed on these various embodiments and those skilled in the art will be able to define others that neutralize in the front-end of the communication network communicating devices of which a malicious third-party has taken control, in order to protect receiver devices located in the back-end of the network. It is underlined here that the access gateway may also contribute to the neutralization of communicating devices by detecting malicious behavior. The collocation of the security device and access gateway thus allows messages sent by communicating devices that have been taken control of by a malicious third-party to be rapidly blocked.

The processing technique is implemented by means of software and/or hardware components. In this light, the term "module" may correspond in this document equally to a software component, to a hardware component or to a set of hardware and/or software components, able to implement a function or a set of functions, according to what was described above with respect to the module in question.

A software component corresponds to one or more computer programs, one or more subroutines of a program, or more generally to any element of a program or of a software package. Such a software component is stored in memory and then loaded and executed by a data processor of a physical entity, and is able to access the hardware resources of this physical entity (memories, storage media, communication buses, input/output circuit boards, user interfaces, etc.).

In the same way, a hardware component corresponds to any element of a hardware assembly. It may be a programmable or non-programmable hardware component, with or without an integrated processor for executing software. It is for example a question of an integrated circuit, a chip card, a circuit board for executing firmware, etc.

In one particular embodiment, the processing module 55 is arranged to implement those of the steps of the processing method described above that are implemented by the security device. These are preferably software modules comprising software instructions for executing those of the steps (or of the actions) of the processing method described above that are implemented by a security device. The invention therefore also relates to:

a program for a security device, comprising program code instructions intended to command the execution of those of the steps (or of the actions) of the processing method described above when said program is executed by this security device;

a storage medium that is readable by a security device, on which the program for a security device is stored.

The software modules may be stored in or transmitted by a data medium. This may be a hardware storage medium, for example a CD-ROM, a floppy disk or a hard disk, or even a transmission medium such as an electrical, optical or radio signal, or a telecommunication network.

Thus, the processing module 55 is configured to:
  verify that a message sent by a communicating device to a receiver device is a message to be transmitted;
  transmit this message when the verification is positive and block it when the verification is negative;
  receive a notification sent by the receiver device indicating that the transmitted message is to be blocked, in order to block during the verification subsequent messages of same type as the message for which the notification was received, sent by communicating devices provided by the same manufacturer and of same product identifier as those of the communicating device that sent said message.

In one particular embodiment, the processing module is furthermore arranged to block subsequent messages of same type as the message for which the notification was received, sent by communicating devices provided by the same manufacturer and of different product identifier to those of the communicating device that sent said message.

A security system comprises:
a security device 50 intended to process a message sent by a communicating device 11,21,31,12,22 to a receiver device 60, said security device comprising a processing module 55 arranged to:
  verify that said message is a message to be transmitted;
  transmit this message when the verification is positive and block it when the verification is negative;
  receive a notification sent by the receiver device indicating that the transmitted message is to be blocked, in order to block during the verification subsequent messages of same type as the message for which the notification was received, sent by communicating devices provided by the same manufacturer and of same product identifier as those of the communicating device that sent said message;
a receiver device, arranged to receive said message sent by the communicating device and transmitted by the security device and to send this notification to the security device.

The invention claimed is:

1. A processing method performed by a security device, the processing method comprising:
  verifying, by the security device, that a message sent by a communicating device to a receiver device is a message to be transmitted, the message being transmitted to the receiver device when the verification is positive;
  receiving, by the security device, a notification sent by the receiver device indicating that the transmitted message is to be blocked; and
  blocking, by the security device, subsequent messages of a type which is the same as a type of the transmitted message for which the notification was received, sent by the communicating device and by other communicating devices which are provided by a manufacturer which is the same as a manufacturer of the communicating device that sent the transmitted message, wherein the blocking of the subsequent messages comprising identifying, by the security device, a manufacturer identifier of the other communicating devices.

2. The method of claim 1, further comprising neutralizing the communicating device for which the notification was received.

3. The method of claim 1, further comprising blocking, by the security device, subsequent messages of same type as the message for which the notification was received, sent by other communicating devices provided by a manufacturer which is the same as the manufacturer of the communicating device that sent the transmitted message and of a different product identifier than a product identifier of the communicating device that sent the transmitted message.

4. The method of claim 1, further comprising obtaining, by the security device, at least one message to be transmitted.

5. The method of claim 1, wherein subsequent messages of a type which is the same as the type of the transmitted message for which the notification was received, sent by communicating devices provided by a manufacturer which is the same as the manufacturer of the communicating device that sent the transmitted message and of a product identifier that is the same as the product identifier of the communicating device that sent the transmitted message are blocked by the security device.

6. A security device configured to process a message sent by a communicating device to a receiver device, the security device comprising a processor and a memory, the security device configured to:
  verify that the message sent by the communicating device to the receiver device is a message to be transmitted;
  transmit the message upon a positive verification;
  block the message upon a negative verification; and
  receive a notification sent by the receiver device indicating that the transmitted message is to be blocked, and block during a verification process subsequent messages of same type as the message for which the notification was received, sent by the communicating device and other communicating devices which are provided by a manufacturer which is the same as a manufacturer of the communicating device that sent the transmitted message, wherein the blocking of the subsequent messages comprising identifying a manufacturer identifier of the other communicating devices.

7. The security device of claim 6, wherein the security device is further configured to block subsequent messages of same type as the message for which the notification was received, sent by other communicating devices provided by a manufacturer which is the same as the manufacturer of the communicating device that sent the transmitted message and of a product identifier different than the product identifier of the communicating device that sent the transmitted message.

8. The security device according to claim 6, wherein the security device is further configured to block subsequent messages of a type which is the same as the type of the transmitted message for which the notification was received, sent by other communicating devices provided by a manufacturer which is the same as the manufacturer of the communicating device that sent the transmitted message and of a product identifier that is the same as the product identifier of the communicating device that sent the transmitted message.

9. A security system, comprising:
  a security device configured to process a message sent by a communicating device to a receiver device, the security device comprising a processor and a memory, the security device configured to:
    verify that the message sent by the communicating device to the receiver device is a message to be transmitted;
    transmit the message upon a positive verification;
    block the message upon a negative verification; and
    receive a notification sent by the receiver device indicating that the transmitted message is to be blocked, and block during a verification process subsequent messages of same type as the message for which the notification was received, sent by the communicating device and by other communicating devices which are provided by a manufacturer which is the same as the manufacturer of the communicating device that sent the transmitted message, wherein the blocking of the subsequent messages comprising identifying a manufacturer identifier of the other communicating devices;
  a receiver device, arranged to receive the transmitted message sent by the communicating device and transmitted by the security device and to send the notification to the security device.

10. A security device comprising a processor and a memory, the memory having stored thereon instructions which, when executed by the processor, cause the security device to implement operations comprising:
  verifying, by the security device, that a message sent by a communicating device to a receiver device is a message to be transmitted, the message being transmitted to the receiver device when the verification is positive;
  receiving, by the security device, a notification sent by the receiver device indicating that the transmitted message is to be blocked; and
  blocking, by the security device, subsequent messages of a type which is the same as a type of the transmitted message for which the notification was received, sent by the communicating device and by other communicating devices which are provided by a manufacturer which is the same as a manufacturer of the communicating device that sent the transmitted message, wherein the blocking of the subsequent messages comprising identifying, by the security device, a manufacturer identifier of the other communicating devices.

11. A non-transitory storage medium readable by a security device having stored thereon instructions which, when executed by a processor, cause the processor to implement operations comprising:
  verifying, by the security device, that a message sent by a communicating device to a receiver device is a message to be transmitted, the message being transmitted to the receiver device when the verification is positive;
  receiving, by the security device, a notification sent by the receiver device indicating that the transmitted message is to be blocked; and
  blocking, by the security device, subsequent messages of a type which is the same as a type of the transmitted message for which the notification was received, sent by the communicating device and by other communicating devices which are provided by a manufacturer which is the same as a manufacturer of the communicating device that sent the transmitted message, wherein the blocking of the subsequent messages comprising identifying, by the security device, a manufacturer identifier of the other communicating devices.

* * * * *